United States Patent [19]

Simpson

[11] Patent Number: 4,969,989

[45] Date of Patent: Nov. 13, 1990

[54] HYDROCARBON CONVERSION PROCESS WITH CATALYTIC MATERIALS OF CONTROLLED GEOMETRIC MEAN ELECTRONEGATIVITY

[75] Inventor: Howard D. Simpson, Irvine, Calif.

[73] Assignee: Union Oil Company of California, Los Angeles, Calif.

[21] Appl. No.: 295,479

[22] Filed: Jan. 10, 1989

Related U.S. Application Data

[62] Division of Ser. No. 350,137, Feb. 19, 1982, Pat. No. 4,816,434.

[51] Int. Cl.$^5$ .............................................. C10G 23/00
[52] U.S. Cl. ........................... 208/216 R; 208/216 PP; 208/217; 208/254 H; 208/108; 208/112; 502/210; 502/213; 502/243
[58] Field of Search ......... 208/251 H, 216 PP, 216 R, 208/217, 254 H; 502/210, 213, 243, 254, 358, 344

[56] References Cited

U.S. PATENT DOCUMENTS

| | | | |
|---|---|---|---|
| 2,890,162 | 6/1959 | Anderson, Jr. et al. | 208/216 |
| 3,900,427 | 8/1975 | Riley et al. | 252/455 |
| 3,966,830 | 6/1976 | Shimada et al. | |
| 3,979,331 | 9/1976 | Striddle | 502/84 X |
| 4,003,828 | 1/1977 | Eberly, Jr. | 208/251 |
| 4,076,613 | 2/1978 | Bearden, Jr. | 255/46.7 X |
| 4,113,656 | 9/1978 | Riley et al. | |
| 4,119,530 | 10/1978 | Czajkowski et al. | 208/213 |
| 4,119,530 | 10/1978 | Czajkowski et al. | |
| 4,234,748 | 11/1980 | Frampton et al. | |
| 4,255,285 | 3/1981 | Engelbach et al. | 252/476 |
| 4,258,201 | 3/1981 | Moy | 252/476 |
| 4,394,302 | 7/1983 | Miller et al. | 502/313 |
| 4,394,302 | 7/1983 | Miller et al. | |

OTHER PUBLICATIONS

Mortier, "Zeolite Electronegatively Related to Physiochem Properties", Journal of Cats., Mar. 1978, 55, pp. 138–145.
Jacobs et al., "Properties of Zeolites in Relation to their Electroneg. Acidity Carboniogenic Activity and Strength of Interaction in Trans. Metal Complexes", J. Inorg. Nucl. Chem., Jul. 1978, 40, pp. 1919–1923.
Ermakov et al., Chem. Abs., 77: 10230y (1972).

*Primary Examiner*—Helane E. Myers
*Attorney, Agent, or Firm*—Alan H. Thompson; Gregory F. Wirzbicki

[57] ABSTRACT

Catalytic materials are modified by adding one or more electropositive and/or electronegative elements thereto in amounts sufficient to adjust the resultant geometric mean electronegativity to a value within a desired or predetermined range. The invention is particularly suited to the preparation of hydrocarbon hydroprocessing catalysts, particularly with respect to hydrodesulfurization catalysts comprising a support material containing a porous refractory oxide. With such catalysts, not only is the geometric mean electronegativity adjusted to a desired value, but if the electropositive or electronegative element added to the catalyst has pore growth promotion properties, the average pore size of the resultant catalyst is increased while its surface area, and usually also its total pore volume, is decreased.

46 Claims, No Drawings

HYDROCARBON CONVERSION PROCESS WITH CATALYTIC MATERIALS OF CONTROLLED GEOMETRIC MEAN ELECTRONEGATIVITY

This application is a division, of application Ser. No. 350,137, filed Feb. 19, 1982 now U.S. Pat. No. 4,816,439.

BACKGROUND OF THE INVENTION

1. Field of the Invention

This invention relates to catalysis, and particularly to hydrocarbon hydroprocessing catalysts, such as those utilized to catalyze the reaction of hydrogen with organosulfur, organonitrogen, and organometallic compounds. More particularly, this invention is directed to catalysts and a method for preparing catalysts for hydrodesulfurizing hydrocarbon liquids.

Residual petroleum oil fractions, such as the heavy fractions produced in atmospheric and vacuum crude distillation columns, are usually undesirable as feedstocks for most refining processes due to their high metals and sulfur content. Economic considerations have recently provided new incentives for catalytically converting the heavy fractions to more marketable products. However, the presence of high concentrations of sulfur and metals, the latter often being found in relatively large porphyrin molecules, precludes the effective use of residua as feedstocks for cracking, hydrocracking, and similar catalytic refining operations.

Methods are available to reduce the sulfur and metals content of residua. One such method is hydrodesulfurization, a process wherein a residuum, usually containing the bulk of the asphaltene components of the original crude from which the residuum was derived, is contacted with a catalyst under conditions of elevated temperature and pressure and in the presence of hydrogen, such that the sulfur components are converted to hydrogen sulfide while the metals are simultaneously deposited on the catalyst.

The typical hydrodesulfurization catalyst is composed of Group VIII and Group VIB components, such as cobalt and/or nickel plus molybdenum components, on a porous refractory oxide support, but it may also contain other components. For example, U.S. Pat. Nos. 3,968,026 through 3,968,029 disclose titanium-promoted alumina supports as highly effective in catalysts promoting desulfurization.

It has also been recognized that catalysts having specific pore size distributions and/or surface area characteristics are effective for hydrodesulfurization purposes. For example, U.S. Pat. Nos. 4,082,695, and 4,089,774 describe processes for removing metals and sulfur from residua utilizing catalysts having specific pore size distributions.

Several methods are known in the prior art to improve the porosity characteristics of support particles used in catalysts. One such method, disclosed in U.S. Pat. No. 2,890,162, involves impregnating a porous starting material with a molybdenum and/or cobalt metal component that serves as a pore size distribution growth promoter. Other methods involve incorporating certain liquids or phosphorus in the catalyst preparation materials, as note U.S. Pat. Nos. 4,022,715 and 4,003,828, respectively. However, these and other methods provided only limited improvements before other desirable characteristics are adversely affected, and a need still exists for alternative methods of producing catalysts and catalyst supports used in hydrorefining processes.

It is, therefore, a major object of the present invention to provide a method for producing hydroprocessing catalysts of improved characteristics, and specifically, to provide a method resulting in a catalyst having a predetermined, beneficial electronegativity for the particular hydrorefining process in which the catalyst will be utilized.

It is another object of the invention to produce catalysts and/or catalyst supports characterized by a predetermined geometric mean electronegativity value.

It is a further object of this invention to provide a method using electropositive and/or electronegative components to control the geometric mean electronegativity value of catalyst supports comprising porous refractory oxide particles, and, optionally, to improve the physical characteristics thereof, as by increasing the average pore diameter or decreasing the surface area, or both.

Another object is to produce improved catalysts and/or catalyst supports by employing, during the preparation of said catalysts or supports, electronegative and/or electro-positive elements that function not only as agents affecting the geometric mean electronegativity of the catalyst or support but also as pore growth promoters, which, in the preferred embodiment, provide for a substantially larger average pore diameter than would be possible if the catalyst or support were prepared under similar conditions but in the absence of said electronegative and/or electropositive element.

Another object is to provide a method for substantially altering the physical and chemical properties of precalcined gamma alumina particles without causing substantial phase transformation to other forms of alumina.

Still another object is to provide a hydrorefining process, and most particularly a hydrodesulfurization process, using catalysts having predetermined geometric mean electro-negativity values, or catalysts having supports characterized by predetermined geometric mean electronegativity values. These and other objects and advantages of the invention will become apparent from the following description.

SUMMARY OF THE INVENTION

Briefly, the invention provides a method for modifying the chemical characteristics of catalysts and/or catalyst support materials by incorporating therewith one or more electropositive and/or electronegative elements followed by calcination at elevated temperatures. Catalysts or catalyst supports prepared in accordance with the invention are characterized by a predetermined geometric mean electronegativity value and, optionally, if a suitable electropositive or electro-negative element is chosen, by a decreased surface area and/or increased average pore diameter in comparison to that obtainable without the added electropositive or electronegative element.

In the invention, the electropositive and/or electronegative elements are added to a catalyst or catalyst support so as to adjust the geometric mean electronegativity thereof to a predetermined value, or within a predetermined range of values. The geometric mean electronegativity of a catalyst or catalyst support is derived from the equation:

$$S = [(S_A)^a(S_B)^b(S_C)^c(S_D)^d \ldots ]^{\frac{1}{a+b+c+d\ldots}}$$

wherein $\overline{S}$ is the geometric mean electronegativity of a catalyst or catalyst support having a molar compositional formula $A_a B_b C_c D_d \ldots$, and wherein $S_A$, $S_B$, $S_C S_D \ldots$ are the electro-negativity values for elements A, B, C, D ..., respectively, with said electronegativity values being those developed for the Periodic Table of Elements by R. T. Sanderson, some of which are set forth hereinafter in Table 1.

The method of the invention is especially useful in the preparation of hydrodesulfurization catalysts. For such catalysts, electropositive and/or electronegative elements are usually added to a refractory oxide material so as to produce a catalyst support having a desired geometric mean electronegativity value between 3.00 and 4.00. For example, using lithium as the electropositive element and phosphorus as the electronegative element, one may shift the geometric mean electronegativity value of a catalyst support either downward with lithium or upward with phosphorus. And at times it may be desirable to use both elements, with lithium often being added first to alter the physical characteristics of the catalyst support, and particularly its average pore size, and with phosphorus then being added to raise the geometric mean electronegativity back to a value suited to the hydrodesulfurization process in which the catalyst will find service.

In one specific embodiment of the invention, a catalyst component useful for hydrodesulfurization is comprised of lithium or magnesium, and optionally phosphorus, on a porous refractory oxide support, with the catalyst component having a geometric mean electronegativity in the range of 3.00 to 3.45 or 3.45 to 3.65. The 3.45 to 3.65 range has been found to provide an optimum compromise in desulfurization, demetallization, and denitrogenation activities coupled with strong resistance to coking; the 3.00 to 3.45 range is yet more resistant to coking and more active for demetallization but is less active for desulfurization and denitrogenation. The foregoing catalyst components are combined with one or more Group VIB or Group VIII metals, particularly cobalt and molybdenum in combination, to produce catalysts highly useful in hydrodesulfurization.

DETAILED DESCRIPTION OF THE INVENTION

The present invention is directed to improving catalysts by a novel preparation method wherein the geometric mean electronegativity value of either the catalyst or its support is controlled to a predetermined value by addition of electronegative and/or electropositive elements in accordance with the following equation:

$$S = [(S_A)^a(S_B)^b(S_C)^c(S_D)^d \ldots ]^{\frac{1}{a+b+c+d\ldots}}$$

wherein $\overline{S}$ is the predetermined geometric mean electronegativity, and $S_A$, $S_B$, $S_C$, $S_D \ldots$ are the electronegativity values of elements A, B, C, D ... and a, b, c, d ... are the stoichiometric constants for the molar compositional formula of the catalyst or support written as $A_a B_b C_c D_d \ldots$ It is understood herein that the ellipsis "..." represents any additional element or elements together with their stoichiometric constant(s) if present in an amount sufficient to alter the geometric mean electronegativity value by one hundredth or more.

To determine the geometric mean electronegativity value of a catalyst or catalyst component in accordance with the invention and the foregoing equation, it is necessary to utilize the electronegativity values of $S_A$, $S_B$, $S_C$, $S_D \ldots$ as developed by R. T. Sanderson. Some of these values are disclosed in Sanderson's *Chemical Bonds and Bond Energy*, Academic Press, 1971, which is herein incorporated by reference in its entirety, and with it being noted that the electronegativity values for a number of elements are listed on page 57. As to other elements not listed, as for example a number of the transition elements, Sanderson has disclosed that the electronegativity values thereof may be determined by reference to the following equation:

$$S = \frac{\sqrt{X} - 0.77}{0.21}$$

published in *Chemical Periodicity* by R. T. Sanderson, Reinhold Publishing Corp., 1960, at page 32. In this equation, X is the Pauling electronegativity value of the element in question, and S is its estimated electronegativity value for purposes herein. A partial list of electronegativity values, suitable herein for calculating the geometric mean electronegativity of a wide variety of catalysts and catalyst components (such as catalyst supports), are set forth in Table 1. The values listed in Table 1 are taken either directly from page 57 of *Chemical Bonds and Bond Energy* or estimated by calculation from the equation on page 32 of *Chemical Periodicity*, with the estimated values being noted by an asterisk.

TABLE 1

| Element | Electronegativity |
|---|---|
| Cs | 0.28 |
| K | 0.42 |
| Na | 0.70 |
| Li | 0.74 |
| Mg | 1.56 |
| Zr | 1.97* |
| Ti | 2.16* |
| Al | 2.22 |
| W | 2.54* |
| Co | 2.72* |
| Mo | 2.72* |
| Ni | 2.72* |
| Si | 2.84 |
| Re | 2.90* |
| Pd | 3.40* |
| Pt | 3.40* |
| Rh | 3.40* |
| P | 3.43 |
| H | 3.55 |
| C | 3.79 |
| S | 4.12 |
| Cl | 4.93 |
| O | 5.21 |
| F | 5.75 |

*Estimated electronegativity values.

The electropositive and/or electronegative elements incorporated into a catalyst or catalyst support in accordance with the invention may be so incorporated at any convenient time during the preparation thereof, and the method of the invention, while applicable to both supported and unsupported catalysts, is particularly useful for supported catalysts comprised of one or more active components on support materials, including, for example, such support materials as activated carbon, charcoal, diatomaceous earth (especially kielseguhr), clay, zeolites, and refractory oxides. The active components of such catalysts most usually comprise a metal, semimetal, metalloid, or compound thereof selected according to its catalytic properties in promoting the desired chemical reaction. For example, if the desired reaction is the air oxidation of hydrogen sulfide to elemental sulfur in the gas phase, a suitable active component would comprise vanadium, a metal known to promote this oxidation. In certain catalysts, such as cracking catalysts, rather than a metal component being the catalytically active component, a zeolite serves this purpose, with the typical cracking catalyst being comprised of a zeolite dispersed in a porous refractory oxide. In other zeolitic catalysts, such as hydrocracking catalysts, the zeolite, although catalytically active, is generally considered part of the support, and the supports of typical hydrocracking catalysts usually comprise both a zeolite and a porous refractory oxide. Such catalysts further contain one or more metal components dispersed upon the support, the metal components then functioning as the catalytically active hydrogenation agents required for hydrocracking reactions.

The method of the invention is directed in its preferred embodiment to the preparation of hydrocarbon conversion catalysts, and more preferably, to hydroprocessing catalysts comprising active metals on a support, and more preferably still, to hydrodesulfurization catalysts comprising Group VIII and VIB active metal components on a non-zeolitic support consisting essentially of a porous refractory oxide. Porous refractory oxides useful in these and other hydrocarbon conversion catalysts include silica, magnesia, silica-magnesia, zirconia, silica-zirconia, titania, silica-titania, etc. Mixtures of the foregoing oxides are also contemplated, especially when prepared as homogeneously as possible.

The preferred refractory oxides comprise aluminum and are usually selected from the group consisting of alumina and silica-alumina. For hydrodesulfurization, gamma alumina is a most highly preferred refractory oxide, as is gamma alumina stabilized with between about 0.5 and 5.0 weight percent of silica.

For catalytic purposes, the support material is usually prepared in the form of shaped particulates by methods well known in the art, with the preferred method being to extrude a precursor of the desired support, as for example, an inorganic refractory oxide gel such as a spray-dried or peptized alumina gel, through a die having openings therein of desired size and shape, after which the extruded matter is cut into extrudates of desired length. Preferred refractory oxide particles are cylindrically shaped and have a cross-sectional diameter of between 1/32 and ¾ inches. More preferred refractory oxide particles, at least for hydrodesulfurization, have cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.04 inches.

Support particles prepared by the foregoing or equivalent procedures are generally precalcined, especially if gamma alumina is the desired support material. Temperatures above about 900° F. are usually required to convert alumina gel or hydrated alumina particulates to gamma alumina. Typically, temperatures between about 1100° F. and 1400° F. are utilized to effect this transformation, with holding periods of ¼ to 3 hours generally being effective.

To prepare hydrocarbon conversion catalysts of the hydroprocessing variety, the support material is compounded, as by impregnation of the calcined support particles, with one or more precursors of a catalytically active metal or metals. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a relatively large volume of the impregnation solution, and yet one more method, the preferred method, is the pore volume or pore saturation technique wherein support particles are introduced into an impregnation of volume just sufficient to fill the pores of the support. On occasion, the pore saturation technique may be modified so as to utilize an impregnation solution having a volume between 10 percent less and 10 percent more than that which will just fill the pores thereof.

If the active metal precursors are incorporated by impregnation, a subsequent or second calcination, as for example at temperatures between 900° F. and 1400° F., converts the metals to their respective oxide forms. This second calcination, however, may be avoided in alternative embodiments of the invention, as for example, by comulling the active metals with the support material rather than impregnating the metals thereon. In comulling, the precursor of the support material, usually in a hydrated or gel form, is admixed with precursors of the active metal components, either in solid form or in solution, to produce a paste suitable for shaping by known methods, e.g., pelleting, extrusion, etc. A subsequent calcination yields a hydroprocessing catalyst containing the active metals in their respective oxide forms.

When hydroprocessing catalysts are prepared by the foregoing or equivalent methods, the active components are usually selected from the Group VIB and VIII metals of the Periodic Table of Elements. Preferably, the catalyst contains both a Group VIB and VIII element, with nickel and cobalt being the preferred Group VIII metals and molybdenum and tungsten being the preferred Group VIB metals, and with cobalt and molybdenum in combination being the most preferred active metals for hydrodesulfurization catalysts. The usual hydroprocessing catalyst will contain from 1 to 20 percent by weight of the Group VIII metal, calculated as the monoxide, and from about 5 to about 30 percent by weight of the Group VIB metal, calculated as the trioxide.

In accordance with the invention, catalysts or catalyst supports, such as those described hereinbefore, are prepared so as to have a geometric mean electronegativity between about 0.9 and 1.1 times, and preferably between about 0.95 and 1.05 times, and more preferably still, between about 0.97 and 1.03 times, a predetermined or preselected value. This may be accomplished, for example, by preparing the catalyst from amounts of both active metals and support materials such that the predetermined value for the catalyst will be achieved. In this embodiment of the invention, the active components themselves are considered as the electropositive and/or electronegative elements that adjust the geometric mean electronegativity to a desired value. But since the amounts of active components required in a catalyst are usually determined by considerations other than the geometric mean electronegativity (and most particularly by the activity and/or selectivity required of the final catalyst), it will most often be necessary to add one or more elements to the catalyst or support to adjust the electronegativity thereof to the predetermined or preselected value. This may be accomplished by adding one or more electronegative and/or electropositive elements, preferably selected from those listed in Table 1, to the catalyst or catalyst support.

The exact method by which the chosen element or elements are added to the catalyst or support is not critical and may be carried out by any of a variety of convenient methods. For example, the chosen element may be dissolved in the same impregnating solution as the active metals, and a subsequent calcination would convert both the chosen element and the active metal to the oxide form. Alternatively, the chosen element could be introduced by a separate impregnation followed by a calcination, or it could be admixed, in either solid or dissolved liquid form, by comulling with the support material precursor and the active metal precursors, followed by a calcination. And if it is desired to adjust the catalyst support, rather than the catalyst, to a predetermined geometric electronegativity value, then the chosen element or elements could be introduced either into the alumina gel, hydrated alumina, or other support material prior to shaping and calcining into a desired size and shape. Alternatively still, the support material could be calcined, then impregnated with the chosen element or elements, and again calcined. These and other methods by which electronegative and/or electropositive elements are added to the catalyst or support thereof are suitable in the practice of the invention, and those procedures involving an addition of the chosen element followed by a calcination above 600° F. are preferred, with temperatures above 900° F. being yet more preferred, and temperatures between 1200° and 1550° F. being most preferred.

The elements added to a catalyst or catalyst support in accordance with the invention are considered electropositive if the geometric mean electronegativity value of the resultant composition is lower as a result of their presence and, conversely, are considered electronegative if the geometric mean electronegativity value is higher due to their presence. For most hydroprocessing catalysts and supports, an element which will usually be found to be electropositive is lithium, while phosphorus is usually electronegative. These two elements are the most highly preferred for use in the invention and are most conveniently introduced into the catalyst in a thermally decomposable, precursor form. For example, typical lithium precursors contain thermally decomposable anions and are generally selected from the group consisting of lithium hydroxide, lithium formate, lithium bicarbonate, lithium acetate, lithium carbonate, and lithium nitrate, with lithium acetate being preferred and lithium nitrate being most preferred. On the other hand, phosphorus is usually added by impregnation in the form of an acid thereof. The most suitable phosphorus-containing acids are metaphosphoric acid, pyrophosphoric acid, hypophosphorous acid, and orthophosphoric acid, the last being most preferred. As those skilled in the art will be aware, other lithium or phosphorus components may also be utilized, and indeed so also may compounds of other electropositive and/or electronegative elements, with the choice being dependent upon a number of factors, as for example, whether or not the added electropositive and/or electronegative metal would detrimentally affect the final catalyst for its intended purpose, e.g., by interfering with desired catalytic properties.

It should be noted that, after addition of the desired electronegative and/or electropositive elements, the resultant geometric mean electronegativity value will be affected not only by the addition of the desired element or elements, but also by others which may be introduced, perhaps unintentionally, along with the desired element. As an illustration, when lithium or phosphorus is introduced into a catalyst support, even in the form of the thermally decomposable materials, the resultant composition contains, after calcination, either lithium or phosphorus in an oxide form, such as $Li_2O$ or $P_2O_5$. But despite the formation of such oxides, the addition of lithium or phosphorus to a catalyst or catalyst support produces the respective intended results, i.e., a decrease or increase, respectively, in the resultant geometric mean electronegativity, with the electronegative effect of phosphorus being enhanced by the highly electronegative oxygen atoms introduced with phosphorus in an oxide form.

Catalysts prepared in accordance with the invention are employed under conditions suited for their intended purposes, as for example, an elevated temperature above 600° F. and a pressure above 500 p.s.i.g. and the presence of hydrogen in the case of hydrocracking catalysts and many other hydrorefining catalysts. Such catalysts are also activated in accordance with methods suited to such catalysts. As an illustration, most hydroprocessing catalysts are more active, sometimes even far more active, in a sulfided or reduced form than in the oxide form in which they are generally prepared Accordingly, hydroprocessing catalysts improved in accordance with the invention may be sulfided or reduced prior to use (in which case the procedure is termed "presulfiding" or "prereducing") by passing a sulfiding or reducing gas, respectively, over the catalyst prepared in the calcined form. Temperatures between 300° and 700° F. and space velocities between about 150 and 500 v/v/hr are generally employed, and this treatment is usually continued for about two hours. Hydrogen may be used to prereduce the catalyst while a mixture of hydrogen and one or more components selected from the group consisting of sulfur vapor and the sulfur compounds (e.g., lower molecular weight thiols, organic sulfides, and especially $H_2S$) is suitable for presulfiding. Generally speaking, the relative proportion of hydrogen in the presulfiding mixture is not critical, with any proportion of hydrogen ranging between 1 and 99 percent by volume being adequate.

If the catalyst is to be used in a sulfided form, it is preferred that a presulfiding procedure be employed. However, since many hydroprocessing catalysts are used to upgrade sulfur-containing hydrocarbons, as in hydrodesulfurization, one may, as an alternative, accomplish the sulfiding in situ, particularly with hydrocarbon feedstocks containing 1.0 weight percent or more of sulfur under conditions of elevated temperature and pressure.

Sulfiding, of course, will alter the geometric mean electronegativity of a catalyst, but the effects of sulfiding are usually ignored, especially when one is interested in the geometric mean electronegativity of the support as opposed to the overall catalyst The reason sulfiding effects can be ignored as to the support is that, as a rule, sulfiding produces chemical changes only in the active metal components on the support and not in the support itself In addition, sulfiding effects even as to the overall catalyst can often be ignored, as for example when one has reason to believe that the degree of sulfiding for a catalyst will be similar to that of a previous catalyst of known geometric mean electronegativity prior to sulfiding. Moreover, since most catalyst manufacturers prepare hydroprocessing catalysts, as well as many others, in the oxide form, it is contemplated in commercial practice, when catalysts of predetermined geometric mean electronegativity are desired, that the predetermined values for such catalysts will pertain to their oxide forms.

The addition of lithium and/or phosphorus (or other electropositive and/or electronegative elements) to a catalyst support to provide for a predetermined geometric mean electronegativity value is applicable to any catalyst, whether useful in promoting hydrocarbon conversion reactions or other chemical reactions, and whether the catalyst contains active metals, as in typical hydrorefining catalysts, or no active metals, as in the case of cracking catalysts comprised of hydrogen ion-exchanged zeolites in combination with porous refractory oxides. The predetermined range will, in the most usual embodiment of the invention, be a range in which beneficial properties result for the particular catalyst being prepared, and in one sense, the invention may be viewed as a method for essentially duplicating beneficial properties of catalysts or catalytic supports by reproducing their geometric mean electronegativity. For example, if it is determined that a first reforming catalyst composed of platinum on alumina has desirable characteristics when prepared to have a geometric mean electronegativity value in the 3.55 to 3.65 range, then, in accordance with the invention, a second reforming catalyst of essentially duplicative properties as the first is prepared by duplicating the geometric mean electronegativity value. In preparing the reforming catalyst of duplicate properties, one could, of course, utilize identical materials and identical preparation procedures and thus obtain the desired geometric mean electronegativity value without adding any electronegative and/or electropositive elements. But as a practical matter, it is seldom possible to use identical materials and/or procedures in the preparation of commercial catalysts. The invention will, therefore, find a special applicability where catalysts or supports of essentially duplicative properties are desired from similar (but not identical) materials using similar (but not identical) procedures as for the catalyst or support whose properties are to be duplicated. In such a case, the duplication is effected, as will now be more fully explained with respect to hydrodesulfurization catalysts, by the addition of electropositive and/or electronegative elements as necessary to adjust the resultant geometric mean electronegativity value into the predetermined range.

As stated above, the most preferred embodiment of the present invention is directed to hydrodesulfurization catalysts, i.e., catalysts used by petroleum refiners to desulfurize high sulfur residua and similar feedstocks in the presence of hydrogen, with a secondary object of hydrodesulfurization often being the reduction of the nitrogen and/or metals. In the present invention, it has been found by appropriate adjustment of the geometric mean electronegativity of porous refractory oxide supports of typical hydrodesulfurization catalysts that the resultant catalyst may be tailored for enhancement of specific catalytic properties. As an illustration, hydrodesulfurization catalysts having supports of geometric mean a specific value between 3.45 and 3.65, and preferably a specific value of 3.55, have now been discovered to exhibit an optimum compromise of activities for desulfurization, denitrogenation, and demetallization. In addition, such catalysts have excellent properties in resisting deactivation due to coke formation, a result believed due to the fact that 3.55 for a geometric mean electronegativity value is equivalent to the hydrogen value shown in Table 1. The 3.55 value, therefore, indicates that the catalyst surface is essentially electrically neutral with respect to hydrogen and thus does not promote the formation of hydrogen cations required for the formation of carbonium ions and many other coke precursors.

Hydrodesulfurization catalysts whose supports have geometric mean electronegativity values outside the 3.45 to 3.65 range are also contemplated in the invention, and the properties of such catalysts, while different from those in the 3.45 to 3.65 range, are still useful. For example, catalysts having supports of geometric mean electronegativity between 3.65 and 4.00, as compared to those in the 3.45 to 3.65 range, have a stronger tendency for promoting coke formation and a somewhat decreased activity for demetallization, but these drawbacks are compensated for by increased denitrogenation and, on occasion, desulfurization activity. On the other hand, those catalysts having supports of geometric mean electronegativity below 3.45, as for example, between 3.00 and 3.45, exhibit better demetallization properties than those in the 3.45 to 3.65 range and, like those in the 3.45 to 3.65 range, have excellent resistance to coking, even exceeding those in the 3.45 to 3.65 range because their surfaces are more electropositive and thus more strongly resist the formation of hydrogen cations. In any event, the enhanced properties of hydrodesulfurization catalysts having supports of geometric mean electronegativity in the 3.00 to 3.45 range are usually offset by sacrifices in desulfurization and denitrogenation activity when compared to catalysts having geometric mean electronegativity values above 3.45.

In order to achieve optimum results with the hydrodesulfurization catalysts of the invention, not only should the geometric mean electronegativity value of the support be adjusted for the intended purpose, but it is also highly desirable that the catalyst have other characteristics conducive to the intended purpose. For example, when a high degree of demetallization is desired along with relatively high desulfurization, then the preferred catalyst should not only be prepared with a catalyst support having a geometric mean electronegativity value effective for this purpose, e.g., between 3.00 and 3.65, but also with a support having relatively large pores providing essentially free access to the active catalytic sites for the large aromatic polycyclic molecules, especially asphaltenes, in which a substantial proportion of the metallic contaminants in residua is usually contained. Typical characteristics of large pore supports useful for this purpose include a surface area between 50 and 180 m$^2$/gm, a pore volume between 0.3 and 1.3 cc/gm, and an average pore diameter above 100 Å, usually between 100 and 300 Å, with the most usual supports for this purpose having a surface area between 60 and 150 m$^2$/gm, a total pore volume between 0.4 and 0.8 cc/gm, and an average pore diameter between 150 and 250 Å, all as determined by known analytical techniques, for example the B.E.T. method for surface area.

Catalysts or catalyst supports having the foregoing physical properties may be obtained commercially, but they may also be prepared with the aid of any element, electropositive or electronegative, having pore growth promotion properties. One pore growth promoter particularly contemplated in the invention is lithium, which may be utilized alone if the resultant geometric mean electronegativity after pore growth promotion is suitable for the desired purpose, or, if not, the addition of lithium may be followed by the further addition of an electronegative element to compensate for the electropositive nature of lithium. For example, in one embodiment of the invention, lithium is added to a relatively small pore catalyst or catalyst support (including, for example, a catalyst support prepared by removing the metals from catalysts previously utilized in hydrocarbon conversion wherein small pore catalysts were acceptable, e.g., hydrodesulfurization with a relatively low degree of metals removal), and after calcination at an elevated temperature, the resultant product will, due to the addition of lithium, often have an undesirably low geometric mean electronegativity value, requiring the addition of an electronegative element such as phosphorus.

The exact amount of the increase one can expect in the average pore diameter by adding lithium varies, being dependent not only upon the initial average pore diameter of the porous refractory oxide to be modified, but also upon the amount of lithium added and the subsequent calcination temperature, with increasing amounts of lithium and increasing calcination temperature above 600° F. independently promoting greater increases in the average pore diameter. Usually, lithium is added in amounts of about 0.1 to 5.0 percent by weight of the catalyst particles or catalyst support particles, and after calcination, an increase in the average pore diameter of 5 to 400%, usually between 10 and 200%, is realized. Concomitant therewith are reductions in the surface area and, oftentimes, in the total pore volume, with both usually being affected by at least 10%, and with the surface area often being reduced by 20 to 50%, sometimes up to 75%, and the total pore volume reduced by 15 to 50%.

The advantages of preparing large pore support hydrodesulfurization catalysts or supports therefor by addition of lithium are several. First, in comparison to many other pore growth promoters, lithium proves to be much more effective. Second, the addition of lithium may, in certain instances, simultaneously result in the required pore growth promotion and the required geometric mean electronegativity. Third, for comparable increases in average pore diameter and decreases in total pore volume and surface area without the addition of lithium or any other pore growth promoter, and with reliance being placed on increased precalcination or calcination temperatures for pore growth promotion, resort to much higher calcination temperatures is required, which in turn requires the expenditure of more energy to produce a similar result. Moreover, the higher temperatures required in the absence of lithium may result in undesirable phase transformations in the support material. For example, if a support consisting essentially of gamma alumina is desired, a calcination above about 1580° F. would result in the formation of delta or perhaps even theta alumina, depending, of course, on the particular calcination temperature used and time period over which it is conducted. But in contrast, lithium is a highly effective pore growth promoter at calcination temperatures substantially below 1580° F., and thus it may safely be used without risking detrimental phase transformations.

After a hydrodesulfurization catalyst of desired chemical and physical characteristics is prepared, it is usually employed as either a fixed or fluidized bed of particulates in a suitable reactor vessel wherein the feedstock to be treated is introduced and subjected to elevated conditions of pressure and temperature, and a substantial hydrogen partial pressure, so as to effect the desired degree of desulfurization, denitrogenation, and demetallization. Most usually, the catalyst is maintained as a fixed bed with the feedstock passing downwardly therethrough, and the reactor is generally operated under conditions selected from those shown in the following Table 2:

TABLE 2

| Operating Conditions | Suitable Range | Preferred Range |
| --- | --- | --- |
| Temperature, °F. | 500–900 | 600–850 |
| Hydrogen Pressure, p.s.i.g. | 500–3000 | 1000–2500 |
| Space Velocity, LHSV | 0.05–3.0 | 0.1–1.5 |
| Hydrogen Recycle Rate, scf/bbl | 1000–15000 | 2000–10000 |

Although virtually any hydrocarbon feedstock containing undesirable proportions of sulfur may be treated by hydrodesulfurization, including, for example, whole crudes and heavy gas oils, the most usual feedstock treated is a sulfur-containing atmospheric or vacuum residuum, especially when the sulfur is present in a proportion exceeding 1.0% by weight. The typical residuum for treatment herein is high boiling (i.e., at least 95% of its constituents boil above about 600° F.) and often contains undesirable proportions of nitrogen, usually in a concentration between about 0.2 and 0.4% by weight. The residuum generally also contains the bulk of the asphaltene components that were present in the original crude. In turn, the bulk of the metallic contaminants contained in most residua is contained in the asphaltenes, in large part as complex metal porphyrins, with the typical metallic contaminants found in residua comprising one or more of vanadium, nickel, iron, sodium, zinc, copper, and arsenic. These metals are usually present in the feedstock such that the concentration of vanadium plus nickel, calculated as the metals, is above about 30 ppmw, usually between about 50 and 500 ppmw.

The results obtained in any particular hydrodesulfurization process will depend upon the nature of the catalyst, the nature of the feedstock, and the severity of the operating conditions. Obviously, the more contaminated the feedstock is with sulfur, nitrogen, and metal components, the more severe the conditions will have to be to achieve given results. In addition, the operating conditions are very much dependent upon the catalyst, for the nature of the catalyst plays a vital role in achieving intended results If high demetallization is desired, then acceptable results will be difficult to achieve a relatively small pore catalyst, even under severe conditions whereas a large-pore catalyst may produce the desired results with only moderate or even mild operating conditions. On the other hand, small-pore catalysts have an advantage in that, because large metal-containing molecules can only reach the surface of small-pore catalysts with difficulty, such catalysts tend to last much longer before fouling occurs. Thus, if what is desired is high desulfurization and long life with some sacrifice of demetallization, then a small-pore catalyst will provide an advantage in this regard.

The following Examples are provided to illustrate various features and/or embodiments of the invention; the Example are not intended to limit the scope of the invention which is defined by the claims.

EXAMPLE I

The geometric mean electronegativity is determined for a hydroprocessing catalyst having the following nominal composition: 12.00 weight percent $MoO_3$, 3.00 weight percent CoO, 4.00 weight percent $P_2O_5$, 1.00 weight percent $Li_2O$, 2.00 weight percent $SiO_2$, and 78.00 weight percent $Al_2O_3$. The molar compositional formula for a 100-gram sample of this catalyst is written as $$Mo_{0.083}Co_{0.040}P_{0.056}Li_{0.066}Si_{0.038}Al_{1.530}O_{2.833}$$

with the total number of moles being 4.646. The geometric mean electronegativity of the catalyst is determined according to the following expression:

$$S = [(S_{Mo})^{0.083}(S_{Co})^{0.040}(S_P)^{0.056}(S_{Li})^{0.066}(S_{Si})^{0.038}(S_{Al})^{1.580}(S_O)^{2.833}]^{\frac{1}{4.646}}$$

and when the Sanderson electronegativity values for each element ($S_{element}$) as expressed or estimated in Table 1 are appropriately substituted, the expression reduces first to:

$$S = [(1.087)(1.041)(1.071)(0.980)(1.040)(3.388)(107.350)]^{\frac{1}{4.646}} \text{ and}$$

then to $S = 3.72$.

EXAMPLE II

In this Example, a hydroprocessing catalyst is increased in average pore size, and its geometric mean electronegativity value is adjusted to the electronegativity of hydrogen, i.e., 3.55.

One hundred grams of conventional hydrodesulfurization catalyst are obtained and determined to have the following nominal composition: 12.00 weight percent $MoO_3$, 3.00 weight percent CoO, 2.00 weight percent $SiO_2$, and 83.00 weight percent $Al_2O_3$. In order to produce a desired change in the pore structure, approximately 4.60 grams of lithium components, calculated as $Li_2O$, are added to the 100-gram sample. The lithium components are in the form of lithium nitrate and thus contain only thermally decomposable anions. After calcination, the catalyst has the following composition: 11.47 weight percent $MoO_3$, 2.87 weight percent CoO, 1.91 weight percent $SiO_2$, 79.35 weight percent $Al_2O_3$, and 4.40 weight percent $Li_2O$. This lithium-containing composition has a geometric mean electronegativity value of 3.44 when calculated in a manner similar to that shown in Example I and is found to have a substantially increased average pore diameter and reduced surface area and total pore volume. Further, the composition has a molar compositional formula of:

$$Mo_{0.0834}Co_{0.040}Si_{0.0333}Al_{1.6280}Li_{0.3080}O_{2.9528}$$

with the total number of moles being 5.0455. The geometric mean electronegativity value of the lithium-modified composition is then raised from 3.44 to the desired value of 3.55 by the addition of approximately 12.10 grams phosphorus components, calculated as $P_2O_5$. This amount of phosphorus is calculated as follows:

$$S = 3.55 = [(S_{Mo})^{0.0834}(S_{Co})^{0.0400}(S_{Si})^{0.0333}(S_{Al})^{1.6280}(S_{Li})^{0.3080}(S_P)^{2N}(S_O)^{2.9528+5N}]^{\left(\frac{1}{5.0455+7N}\right)}$$

with N being the number of moles of $P_2O_5$ required for addition to the 104.60 gram catalyst sample. Upon substitution of Sanderson electronegativity values for each element ($S_{element}$) from Table 1, the expression is simplified to:

$$S = 3.55 = [(3.908)(3.43)^{2N}(5.21)^{2.9528+5N}]^{\left(\frac{1}{5.0455+7N}\right)}$$

from which N is determined to be 0.085 moles, corresponding to 12.10 grams of phosphorus, as $P_2O_5$, which is added to the catalyst in the form of $H_3PO_4$.

After a subsequent calcination, a final catalyst is produced characterized by a geometric mean electronegativity of 3.55, an increased average pore diameter and decreased volume and surface area in comparison to the original catalyst, and a nominal composition as follows 10.30 weight percent $MoO_3$, 2.60 weight percent CoO, 1.70 weight percent $SiO_2$, 71.20 weight percent $Al_2O_3$, 3.90 weight percent $Li_2O$, and 10.40 weight percent $P_2O_5$.

EXAMPLE III

In this example, it is desired to prepare catalyst support particles, especially useful in hydrodesulfurization catalysts, having a geometric mean electronegativity of 3.55. The support particles are initially in a lithium-treated form wherein 4.60 grams of lithium components, calculated as $Li_2O$, are incorporated with 85 grams of alumina support particles containing 2.36 weight percent silica (2 grams of silica). The lithium components are in the form of lithium nitrate, and after calcination, the resultant composition, in addition to having an increased average pore diameter above about 100 Å, has the following molar composition:

$$Si_{0.333}Al_{1.6280}Li_{0.3080}O_{2.6626}$$

with the total number of moles being 4.6319. Following the calculation method shown in Example I, the calculated geometric mean electronegativity is 3.38, and following the calculation method of Example II, it is determined that 18.50 grams of phosphorus components, calculated as $P_2O_5$, are required to raise the geometric mean electronegativity to 3.55. After the addition of the 18.50 grams of phosphorus components in the form of $H_3PO_4$, the particles are calcined, and in finished form, have the following nominal composition:

1.90 weight percent SiO₂, 76.9 weight percent Al₂O₃, 4.2 weight percent Li₂O, and 17.1 weight percent P₂O₅.

EXAMPLE IV

A hydrocarbon reforming catalyst is modified by the addition of lithium components to produce a finished catalyst having a preselected geometric mean electronegativity value of 3.55.

At the onset, one hundred grams of a pre-reduced, conventionally produced reforming catalyst are obtained and determined to have the following nominal composition: 0.30 weight percent Pt, 0.30 weight percent Re, 1.00 weight percent Cl, and the remainder Al₂O₃, with it being assumed that the chlorine reacts with aluminum and is therefore present as AlCl₃. Using a similar calculation procedure as that in Example I, the geometric mean electronegativity is calculated as 3.70 from the molar compositional formula expressed as $$Pt_{0.00154}Re_{0.00161}Cl_{0.02821}Al_{1.930}O_{2.881}$$

In order to lower the geometric mean electronegativity value of the catalyst to 3.55, 2.20 grams of lithium components, calculated as Li₂O, is added to the 100 gram sample of the catalyst in the form of lithium nitrate. From the above-expressed molar compositional formula, the amount of lithium required is calculated in a similar manner to that for the desired amount of phosphorus in Example II, and more particularly, is calculated as follows:

$$S = 3.55 = [(S_{Pt})^{0.00154}(S_{Re})^{0.00161}(S_{Cl})^{0.02821}(S_{Al})^{1.930}(S_{Li})^{2N}(S_O)^{2.881+N}]^{\left(\frac{1}{4.843+3N}\right)}$$

where N, representing the moles of Li, is determined to be 0.075 moles, which corresponds to 2.20 grams of Li₂O.

It should perhaps be noted that in the above calculations neither the amount of platinum or rhenium in the catalyst would affect the geometric mean electronegativity value by more than a hundredth and, thus, for the sake of simplicity, and without a significant effect in the final determination, the foregoing calculations could have been made without considering the effects of platinum and rhenium. In that event, the geometric mean electronegativity prior to lithium addition would have been 3.71 instead of 3.70. The amount of lithium oxide required to lower this value to the desired 3.55 would be 2.20 grams, the same as before. As is therefore evident, the calculation without considering either platinum or rhenium makes no change in the end result.

EXAMPLE V

A Y zeolite useful in a cracking or hydrocracking catalyst is desired from a Y zeolite initially having its ion exchange capacity 50% satisfied with sodium ions and 50% with hydrogen ions. The zeolite has the following compositional formula:

$$Na_{0.5}H_{0.5}(SiO_2)_{12}(A_lO_2)$$

and its geometric mean electronegativity value is calculated according to the expression:

$$S = [(S_{Si})^{12}(S_{Al})(S_O)^{26}(S_H)^{\frac{1}{2}}(S_{Na})^{\frac{1}{2}}]^{\frac{1}{40}} = 4.13$$

All the sodium ions are removed by ion exchange with hydrogen ions by known methods. After ion exchange, the geometric mean electronegativity value is calculated as follows:

$$S = [(S_{Si})^{12}(S_{Al})(S_O)^{26}(S_H)]^{\frac{1}{40}} = 4.21$$

When the foregoing zeolite is used in a cracking catalyst, as for example, in a catalyst comprising the zeolite dispersed in a matrix of an alumina porous refractory oxide, the catalyst composition will have an overall geometric mean electronegativity based on the combined effects of both the zeolite and the alumina. But since the composition is not homogeneous, but rather an admixture of zeolite and alumina, it may be more useful to consider the geometric mean electronegativity of the catalytic components themselves, so that if the alumina in the support has a geometric mean electronegativity value of 3.70, then one can visualize the catalyst as containing two catalytically distinct components, a zeolite of geometric mean electronegativity of 4.21 and an alumina matrix of geometric mean electronegativity of 3.70.

EXAMPLE VI

Catalyst A, prepared in accordance with the invention, is tested against a commercial reference catalyst. The reference catalyst contains 12.0 weight percent of molybdenum components, calculated as MoO₃, and 4.0 weight percent of cobalt components, calculated as CoO, with the balance consisting essentially of silica-containing gamma alumina, the SiO₂ content being about 1.0 weight percent of the entire catalyst and about 1.2 weight percent of the support.

The silica-containing gamma alumina support of the reference catalyst has a geometric mean electronegativity value of 3.71 when calculated in a manner as shown in Example I. Physical characteristics of the reference catalyst include a total pore volume of 0.48 cc/gram, an average pore diameter of 70 angstroms, and a surface area of 270 m²/gram.

Catalyst A, compared against the reference catalyst, is prepared as follows: Five hundred grams (500 g) of alumina support particles are impregnated with 350 ml of an aqueous solution containing 96.4 grams of lithium nitrate (LiNO₃). The preparation is oven-dried overnight at 110° C. One hundred twenty-five grams (125 g) of the dried support is then calcined at 1500° F. for one-half hour in flowing air. The calcined composition is subsequently prewetted with 20 ml of water and impregnated with 70 ml of an aqueous solution containing 24.6 grams of ammonium heptamolybdate, 27.4 grams of 85 percent phosphoric acid (H₃PO₄) solution, and 19.4 grams of cobalt nitrate (Co(NO₃)₂·6H₂O). After aging for two hours, the catalyst is dried at 110° C. and calcined at 1200° F. in flowing air.

A final catalyst is produced having a nominal composition as follows: 12.0 weight percent of molybdenum components, calculated as MoO₃, 3.0 weight percent of cobalt components, calculated as CoO, and 8.3 weight percent phosphorus components, calculated as P₂O₅, and 2.5 weight percent lithium components, calculated as Li₂O, with the balance consisting essentially of gamma alumina. The lithium-phosphorus-alumina support composition of Catalyst A has a geometric mean electronegativity value of 3.57when calculated in a manner as shown in Example I. Physical characteristics of Catalyst A include a total pore volume of 0.35 cc/gram, an average pore diameter of 130 angstroms, and a surface area of 111 m²/gram.

Catalyst A and the reference catalyst are, in separate runs, charged to a reactor and utilized to hydrodesulfurize a Kuwait atmospheric residuum feedstock having the characteristics shown in Table 3. The operating conditions are shown in Table 4 below.

TABLE 3
FEEDSTOCK PROPERTIES

| Feed Description | Kuwait atmospheric residuum |
|---|---|
| Gravity, °API @ 60° F. | 16.8 |
| Sulfur, wt. % | 3.7 |
| Nitrogen, wt. % | .21 |
| Vanadium, ppmw | 49 |
| Nickel, ppmw | 14 |
| Asphaltenes, wt. % | 6.9 |
| Carbon residue, D-189, wt. % | 8.7 |
| Distillation, D-1160, °F. | |
| IBP | 487 |
| 5 | 610 |
| 10 | 664 |
| 20 | 739 |
| 30 | 805 |
| 40 | 868 |
| 50 | 937 |
| 60 | 1038 |
| Max. | 1108 |
| Rec. | 73.0 |

TABLE 4
OPERATING CONDITIONS

| | Reference | Catalyst A |
|---|---|---|
| Run length, days | 19 | 19 |
| Temperature, °F. | 720 | 700 (days 1-9) |
| | | 720 (days 10-19) |
| Hydrogen Recycle Rate, scf/b | 4100 | 4100 |
| Reactor Pressure, p.s.i.g. | 1400 | 1400 |
| Space Velocity, LHSV | 0.5 | 0.5 |

Catalyst A and the reference catalyst are then tested to determine their individual performances after the runs of 19 days. The results of these tests are summarized in Table 5.

TABLE 5
CATALYST PERFORMANCE AT 19 DAYS

| | Catalyst A | Reference |
|---|---|---|
| Sulfur, % Removal | 91 | 88 |
| Nitrogen, % Removal | 40 | 50 |
| Vanadium, % Removal | 90 | 66 |
| Nickel, % Removal | 76 | 46 |
| Asphaltenes, % Removal | 68 | 43 |

The data in Table 5 establish the demetallization superiority of a large pore catalyst (Catalyst A) having a support of 3.55 geometric mean electronegativity over a comparative small pore catalyst having a support of higher geometric mean electronegativity, i.e., 3.71. The data further establish that the desulfurization activity of Catalyst A is somewhat superior to the reference catalyst, but, because of lithium addition, Catalyst A exhibits a decrease in denitrogenation activity commensurate with the lower geometric mean electro-negativity of its support. However, this loss is more than compensated for by the sharp increases in demetallization plus the slight increase in desulfurization activity.

Although the invention has been described in conjunction with a preferred embodiment thereof, it is evident that many alterations, modifications, and variations will be apparent to those skilled in the art in light of the foregoing description. Accordingly, it is intended in the invention to embrace these and all such alternatives, modifications, and variations as may fall within the spirit and scope of the appended claims.

I claim:

1. In a catalytic hydrocarbon conversion process wherein a hydrocarbon feedstock is upgraded by contact with a particulate catalyst under conditions of elevated temperature and pressure, the improvement wherein said catalyst comprises a non-zeolitic support material, said support material consisting essentially of a porous refractory oxide, said catalyst prepared by a method comprising the step of incorporating one or more electropositive or electronegative elements with said catalyst, said electropositive or electronegative elements being incorporated in a sufficient amount to alter the geometric mean electronegativity about 0.9 to 1.1 times that of a predetermined value in the range from about 3.45 to about 3.65, said amount being determined by the equation:

$$\overline{S} = [(S_A)^a(S_B)^b(S_C)^c(S_D)^d \ldots ]^{\frac{1}{a+b+c+d+\ldots}}$$

wherein $\overline{S}$ is the predetermined geometric mean electronegativity value from a product composition having a molar compositional formula $A_aB_bC_cD_d \ldots$ and wherein $S_A$, $S_B$, $S_C$, $S_D \ldots$ are electronegativity values for the respective elements A, B, C, D . . . of the product composition which affect the value of S by at least one hundredth.

2. The process defined in claim 1 wherein said electropositive or electronegative elements are incorporated in an amount such that said product composition has a geometric mean electronegativity between about 0.95 and about 1.05 times that of said predetermined value.

3. In a catalytic hydrodesulfurization process comprising a sulfur-containing hydrocarbon feedstock under conditions of elevated temperature and pressure and in the presence of hydrogen so as to desulfurize the feedstock by conversion of sulfur constituents therein to hydrogen sulfide, the improvement wherein said catalyst comprises lithium and phosphorus in a non-zeolitic support material consisting essentially of a porous refractory oxide and being characterized by a geometric mean electronegativity value between about 3.45 and 3.65, said geometric mean electronegativity value being determined in accordance with the following equation $$\overline{S} = [(S_A)^a(S_B)^b(S_C)^c(S_D)^d \ldots ]^{\frac{1}{a+b+c+d+\ldots}}$$

wherein $\overline{S}$ is the geometric mean electronegativity value of said composition having a molar compositional formula $A_aB_bC_cD_d \ldots$ and wherein $S_A$, $S_B$, $S_C$, $S_D$, . . . are the electronegativity values for the respective elements A, B, C, D . . . in said composition which affect the value of $\overline{S}$ by at least one hundredth.

4. The process defined in claim 3 having an average pore diameter above about 100 angstroms.

5. The process defined in claim 3 comprising a supported Group VIB or Group VIII metal component.

6. The process defined in claim 3 wherein said porous refractory oxide consists essentially of gamma alumina.

7. The process defined in claim 6 wherein said catalyst further comprises a Group VIB or Group VIII metal component supported on said porous refractory oxide.

8. The process defined in claim 6 comprising cobalt and molybdenum catalytically active components supported on said porous refractor oxide.

9. The process defined in claim 6 wherein said support material having a surface area between 50 and 180 m²/gram, a pore volume between 0.3 and 1.3 cc/gram, and an average pore diameter between 100 and 300 angstroms with said composition being characterized by a geometric mean electronegativity value between about 3.45 and about 3.65.

10. A process as defined in claim 3 wherein, during said contacting, the feedstock is demetallized by deposition of metals on the catalyst and denitrogenated by conversion of nitrogen constituents to ammonia.

11. A catalytic demetallization process wherein a hydrocarbon feedstock containing contaminant metals is upgraded by contact with a particulate catalyst under conditions of elevated temperatures and pressure to produce a product hydrocarbon containing a reduced content of contaminant metals compared to the contaminant metals content in said feedstock, said catalyst comprising lithium and phosphorus in a non-zeolitic support material consisting essentially of a porous refractory oxide and being characterized by a geometric mean electronegativity value between about 3.45 and 3.65 said geometric mean electronegativity value being determined in accordance with the following equation:

$$S = [(S_A)^a (S_B)^b (S_C)^c (S_D)^d \ldots]^{\frac{1}{a+b+c+d+\ldots}}$$

wherein $\overline{S}$ is the geometric mean electronegativity value of said composition having a molar compositional formula $A_a B_b C_c D_d \ldots$ and wherein $S_A$, $S_B$, $S_C$, $S_D \ldots$ are the electronegativity values for the respective elements A, B, C, D ... in said composition which affect the value of $\overline{S}$ by at least one hundredth.

12. The process defined in claim 11 wherein said catalyst comprises a supported Group VIB or Group VIII metal component.

13. The process defined in claim 12 wherein said catalyst has an average pore diameter between about 100 and 300 angstroms, a surface area between 50 and 180 m²/gram and a total pore volume between 0.3 and 1.3 cc/gram.

14. The process defined in claim 13 wherein said catalyst has an average pore diameter between 150 and 250 angstroms, said surface area is between 60 and 150 m²/gram, and said total pore volume is between 0.4 and 0.8 cc/gram.

15. The process defined in claim 11 wherein said porous refractory oxide consists essentially of gamma alumina.

16. The process defined in claim 11 wherein said catalyst comprises a Group VIB or Group VIII metal component supported on said porous refractory oxide.

17. The process defined in claim 11 wherein said catalyst comprises cobalt and molybdenum catalytically active components supported on said porous refractory oxide.

18. A catalytic denitrogenation process wherein a hydrocarbon feedstock containing nitrogen is upgraded by contact with a particulate catalyst under conditions of elevated temperature and pressure to produce a product hydrocarbon containing a reduced content of nitrogen compared to the nitrogen content in said feedstock, said catalyst comprising lithium and phosphorus in a non-zeolitic support material consisting essentially of a porous refractory oxide and being characterized by a geometric mean electronegativity value between about 3.45 and 3.65 said geometric mean electronegativity value being determined in accordance with the following equation:

$$S = [(S_A)^a (S_B)^b (S_C)^c (S_D)^d \ldots]^{\frac{1}{a+b+c+d+\ldots}}$$

wherein $\overline{S}$ is the geometric mean electronegativity value of said composition having a molar compositional formula $A_a B_b C_c D_d \ldots$ and wherein $S_A$, $S_B$, $S_C$, $S_D \ldots$ are the electronegativity values for the respective elements A, B, C, D ... in said composition which affect the value of $\overline{S}$ by at least one hundredth.

19. The process defined in claim 18 wherein said catalyst comprises a supported Group VIB or Group VIII metal component.

20. A process defined in claim 18 wherein said porous refractory oxide consists essentially of gamma alumina.

21. The process defined in claim 18 wherein said catalyst comprises cobalt and molybdenum catalytically active components supported on said porous refractory oxide.

22. A catalytic hydrodesulfurization process comprising contacting a sulfur-containing hydrocarbon feedstock with a particulate catalyst under conditions of elevated temperature and pressure in the presence of hydrogen so as to desulfurize the feedstock by conversion of sulfur constituents therein to hydrogen sulfide, said catalyst prepared by a method comprising the steps of:

(1) incorporating one or more electropositive or electronegative elements listed in Table 1 with a non-zeolitic support consisting essentially of a porous refractory oxide, said electropositive or electronegative elements being incorporated in an amount such that, after the calcination in step (2), a product composition having a geometric mean electronegativity within about 0.9 and 1.1 times a predetermined value in the range from about 3.45 to about 3.65 is produced, said amount being calculated by the equation:

$$S = [(S_A)^a (S_B)^b (S_C)^c (S_D)^d \ldots]^{\frac{1}{a+b+c+d+\ldots}}$$

wherein $\overline{S}$ is the predetermined geometric mean electronegativity value for the product composition having a molar compositional formula $A_a B_b C_c D_d \ldots$ and wherein $S_A$, $S_B$, $S_C$, $S_D \ldots$ are electronegativity values for the respective elements A, B, C, D ... of the product composition which affect the value of $\overline{S}$ by at least one hundredth, (2) calcining the resultant composition produced in step (1) at an elevated temperature to produce the product composition characterized by a geometric mean electronegativity value between about 0.9 and 1.1 times that of said predetermined geometric mean electronegativity value, and (3) incorporating Group VIB and Group VIII metal hydrogenation components with the product composition obtained in step (2), and (4) calcining the composition obtained from step (3) to produce a catalytic composition comprising Group VIB and Group VIII metals, and said electropositive or electronegative elements on said refractory oxide.

23. The process defined in claim 22 wherein said predetermined geometric mean electronegativity value is about 3.55.

24. The process defined in claim 22 wherein lithium as an electropositive element or phosphorus as an electronegative element is incorporated with said refractory oxide.

25. The process defined in claim 22 wherein said refractory oxide comprises alumina.

26. The process defined in claim 22 wherein an electropositive element is incorporated with said porous refractory oxide, said electropositive element having pore growth promotion properties, such that said product composition has a larger average pore diameter than would be obtainable by a similar preparation method but without the incorporation of said electropositive element.

27. The process defined in claim 24 wherein said phosphorus component is selected from the group consisting of metaphosphoric acid, pyrophosphoric acid, hypophosphorus acid and orthophosphoric acid.

28. The process defined in claim 24 wherein said lithium component is selected from the group consisting of lithium nitrate, lithium acetate, and lithium carbonate.

29. A catalytic hydroprocessing process comprising contacting a hydrocarbon-containing feedstock with a particulate catalyst under conditions of elevated temperature above 600° F. and pressure above 500 p.s.i.g. and in the presence of hydrogen so as to upgrade the feedstock by conversion of feedstock sulfur constituents therein to hydrogen sulfide, feedstock nitrogen constituents to ammonia or feedstock contaminant metals deposited on said catalyst, said catalyst comprising lithium and phosphorus in a non-zeolitic support material consisting essentially of a porous refractory oxide and being characterized by a geometric mean electronegativity value between about 3.45 and 3.65 said geometric mean electronegativity value being determined in accordance with the following equation:

$$S = [(S_A)^a(S_B)^b(S_C)^c(S_D)^d \ldots ]^{\frac{1}{a+b+c+d+\ldots}}$$

wherein $\overline{S}$ is the geometric mean electronegativity value of said composition having a molar compositional formula $A_aB_bC_cD_d\ldots$ and wherein $S_A$, $S_B$, $S_C$, $S_D\ldots$ are the electronegativity values for the respective elements A, B, C, D $\ldots$ in said composition which affect the value of $\overline{S}$ by at least one hundredth.

30. The process defined in claim 29 wherein said catalyst having an average pore diameter above about 100 angstroms.

31. The process defined in claim 29 wherein said catalyst comprising a supported Group VIB or Group VIII metal component.

32. The process defined in claim 29 wherein said catalyst having an average pore diameter between about 100 and 300 angstroms, said surface area is between 50 and 180 m²/gram and a total pore volume is between 0.3 and 1.3 cc/gram.

33. The process defined in claim 29 wherein said catalyst having an average pore diameter between 150 and 250 angstroms, said surface area is between 60 and 150 m²/gram, and said total pore volume is between 0.4 and 0.8 cc/gram.

34. The process defined in claim 29 wherein said porous refractory oxide consists essentially of gamma alumina.

35. The process defined in claim 29 wherein said catalyst comprises cobalt and molybdenum catalytically active components supported on said porous refractory oxide.

36. A catalytic hydroprocessing process comprising contacting a hydrocarbon-containing feedstock with a particulate catalyst under conditions of elevated temperature above 600° F. and pressure above 500 p.s.i.g. and in the presence of hydrogen so as to upgrade the feedstock by conversion of feedstock sulfur constituents therein to hydrogen sulfide, feedstock nitrogen constituents to ammonia or feedstock contaminant metals deposited on said catalyst, said catalyst prepared by a method comprising the steps of:

(1) incorporating one or more electropositive or electronegative elements listed in Table 1 with a non-zeolitic support consisting essentially of a porous refractory oxide, said electropositive or electronegative elements being incorporated in an amount such that, after the calcination in step (2), a product composition having a geometric mean electronegativity within about 0.9 and 1.1 times a predetermined value in the range from about 3.45 to about 3.65 is produced, said amount being calculated by the equation:

$$S = [(S_A)^a(S_B)^b(S_C)^c(S_D)^d \ldots ]^{\frac{1}{a+b+c+d+\ldots}}$$

wherein $\overline{S}$ is the predetermined geometric mean electronegativity value for the product composition having a molar compositional formula $A_aB_bC_cD_d\ldots$ and wherein $S_A$, $S_B$, $S_C$, $S_D\ldots$ are electronegativity values for the respective elements A, B, C, D $\ldots$ of the product composition which affect the value of $\overline{S}$ by at least one hundredth, (2) calcining the resultant composition produced in step (1) at an elevated temperature to produce the product composition characterized by a geometric mean electronegativity value between about 0.9 and 1.1 times that of said predetermined geometric mean electronegativity value, and (3) incorporating Group VIB and Groups VIII meal hydrogenation components with the product composition obtained in step (2), and (4) calcining the composition obtained from step (3) to produce a catalytic composition comprising Group VIB and Group VIII metals, and said electropositive or electronegative elements on said refractory oxide.

37. The process defined in claim 36 wherein said predetermined geometric mean electronegativity value is about 3.55.

38. The process defined in claim 36 wherein lithium as an electropositive element or phosphorus as an electronegative element is incorporated with said refractory oxide.

39. The process defined in claim 36 wherein said refractory oxide comprises alumina.

40. The process defined in claim 36 wherein an electropositive element is incorporated with said porous refractory oxide, said electropositive element having pore growth promotion properties, such that said product composition has a larger average pore diameter than would be obtainable by a similar preparation method but without eh incorporation of said electropositive element.

41. The process defined in claim 36 wherein said catalyst prepared by a method comprising the steps of:
  (1) incorporating a lithium component and a phosphorus component with a porous refractory oxide comprising non-zeolitic support material consisting essentially of alumina, said lithium and phosphorus components being incorporated in an amount such that, after the calcination in step (2), a product composition having a geometric means electronegativity within about 0.95 and 1.05 times a predetermined value in the range from about 3.45 to about 3.65 is produced, said amount being determined by the equation:

$$S = [(0.74)^a (3.43)^b (S_C)^c (S_D)^d \ldots]^{\frac{1}{a+b+c+d+\ldots}}$$

wherein $\overline{S}$ represents the predetermined geometric mean electronegativity value of the product composition having a molar compositional formula $Li_a P_b C_c D_d \ldots$ and wherein $S_C, S_D \ldots$ are electronegativity values for the respective elements, C, D ... of the product composition which, in addition to lithium and phosphorus, affect the value of $\overline{S}$ by at least one hundredth,
  (2) calcining the lithium and phosphorus incorporated refractory oxide produced in step (1) at a temperature greater than about 1200° F. to produce said product composition characterized by a geometric mean electronegativity value between about 0.95 and 1.05 times that of said predetermined geometric mean electronegativity value,
  (3) impregnating the product composition obtained in step (2) with molybdenum and cobalt or nickel components, and
  (4) calcining the composition obtained from step (3) to produce a catalytic composition.

42. The process defined in claim 41 wherein said predetermined geometric mean electronegativity value is about 3.55.

43. The process defined in claim 41 wherein said product composition obtained in step (2) has an average pore diameter between about 1.05 and about four times that of said refractory oxide.

44. The process defined in claim 36 wherein said catalyst prepared by a method comprising the steps of:
  (1) incorporating lithium and phosphorus components with said composition, said lithium and phosphorus components being incorporated in an amount such that, after the calcination in step (2), a calcined product having a geometric mean electronegativity within about 0.95 and about 1.05 times a predetermined value in the range from about 3.45 to about 3.65 is produced, said amount being determined by the equation:

$$S = [(0.74)^a (3.43)^b (2.22)^c (2.84)^d (5.21)^e]^{\frac{1}{a+b+c+d+e+}}$$

wherein $\overline{S0}$ represents the predetermined geometric mean electronegativity value for the calcined product composition having a molar compositional formula $Li_a P_b Al_c Si_d O_e$, and
  (2) calcining the resultant composition so as to produce the calcined product.

45. The process defined in claim 44 wherein said phosphorus component is selected from the group consisting of metaphosphoric acid, pyrophosphoric acid, hypophosphorus acid and orthophosphoric acid.

46. The process defined in claim 44 wherein said lithium component is selected from the group consisting of lithium nitrate, lithium acetate, and lithium carbonate.

* * * * *

UNITED STATES PATENT AND TRADEMARK OFFICE
CERTIFICATE OF CORRECTION

PATENT NO. : 4,969,989

DATED : November 13, 1990

INVENTOR(S) : Howard D. Simpson

It is certified that error appears in the above-identified patent and that said Letters Patent is hereby corrected as shown below:

Col. 18, claim 1, line 34, "from" should be --for--; line 38, "S" should be --$\bar{S}$--.
Col. 18, claim 3, line 60, "S" should be --$\bar{S}$--.
Col. 19, claim 8, line 13, "refractor" should be --refactory--.
Col. 19, claim 11, line 41, "S" should be --$\bar{S}$--.
Col. 20, claim 18, line 21, "S" should be --$\bar{S}$--.
Col. 20, claim 22, line 60, "S" should be --$\bar{S}$--.
Col. 21, claim 29, line 58, "S" should be --$\bar{S}$--.
Col. 22, claim 36, line 45, "S" should be --$\bar{S}$--.
Col. 23, claim 40, line 16, "eh" should be --the--.
Col. 23, claim 41, line 26, "means" should be --mean--.
Col. 23, claim 41, line 34, "S" should be --$\bar{S}$--.
Col. 24, claim 44, line 30, "S" should be --$\bar{S}$--; line 31, "$\bar{S}$0" should be --$\bar{S}$--.

Signed and Sealed this

Fifth Day of May, 1992

Attest:

DOUGLAS B. COMER

Attesting Officer

Acting Commissioner of Patents and Trademarks